United States Patent Office 3,613,171
Patented Oct. 19, 1971

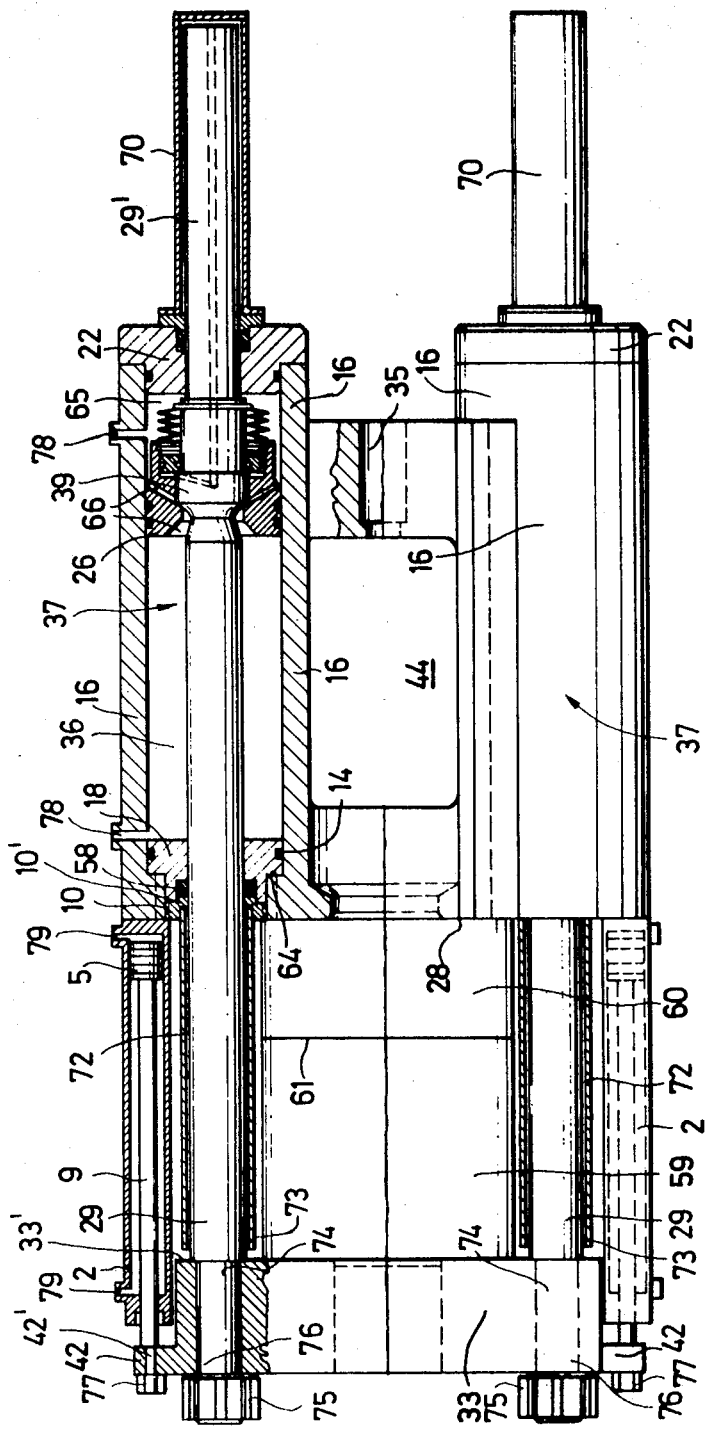

3,613,171
CLAMPING UNIT FOR MOLDING MACHINES
Karl Hehl, 183 Siedlung, 7291 Lossburg,
Wurttemburg, Germany
Filed July 29, 1970, Ser. No. 59,135
Claims priority, application Germany, July 30, 1969,
G 69 30 136.6
Int. Cl. B29f 1/06
U.S. Cl. 18—30 LV                    11 Claims

ABSTRACT OF THE DISCLOSURE

A clamping unit for a mold designed for processing synthetic material has a cylinder block defining a plurality of cylinders. Each cylinder has a piston rod arranged therein to form a fluid drive means for clamping a movable and a fixed mold part together. The movable mold part is attached to the piston rods by means of a movable clamping plate. A sleeve member is arranged over a respective piston rod in the space between the respective cylinder and the movable clamping plate, and is attached to the end face of the respective cylinder.

BACKGROUND OF THE INVENTION

The present invention relates to a clamping unit for the mold blocks, or parts, of a machine for processing synthetic materials. This clamping unit is of the type in which the support portion of one mold part is disposed on the piston rods of the pistons of fluid drive cylinders and the other mold part is mounted on the end faces of the drive cylinders.

Clamping units of this type, in spite of the fact that the hydraulic cylinders are disposed parallel to the opening and closing directions of the mold, are distinguished by compact and stable construction. This is particularly true when the mold is brought into or held in its closed position without using a toggle lever arrangement to transmit the force from the piston rods to the mold clamps. For examples of the use of toggle levers in molding devices, see U.S. Pats. Ser. Nos. 2,252,107, issued Aug. 12, 1941 to M. F. Weida, 2,447,256, issued Aug. 17, 1948 to E. R. Knowles, and 2,671,246, issued Mar. 9, 1954 to N. Lester.

In clamping units of the type which do not use a toggle lever arrangement to transmit the force from the piston rods to the clamping plates, the outer surfaces of the piston rods are subject to excessive wear. They are particularly endangered due to their immediate proximity to the mold parts. These mold parts are partially loaded with inserts and the like, and are exchanged again and again during the life of a clamping unit. Thus, the exposed surface of the piston rods can be easily damaged.

SUMMARY OF THE INVENTION

It is an object of the present invention to construct a clamping unit of the type referred to above in which the extended portions of the piston rods are protected from excessive wear and damage. This object is accomplished according to the present invention by enclosing the extended portions of the piston rods with protective sleeve members.

This construction of the clamping units accomplishes with a minimum of technical effort and expense the elimination of, for example, scratches and the like on the outer surface of the extended portion of the piston rods which could influence the proper functioning of these rods.

Advisably, the protective sleeves are anchored in the end faces of the respective cylinders.

BRIEF DESCRIPTION OF THE DRAWINGS

The sole figure is an elevation view, partly in cross section, of a clamping unit according to the present invention.

DESCRIPTION OF THE PREFERRED EMBODIMENTS

The clamping unit shown in the figure is constructed around a cylinder block 16 which is mounted to the base of a molding machine (not shown) by means of suitable supporting struts (not shown) which may be inserted into bores 35 of the block 16. Only one bore 35 is shown in the figure. A suitable base and suitable supporting struts may be seen in FIG. 1 of U.S. application Ser. No. 792,571, filed Jan. 21, 1969, by Karl Hehl; as can be, for example, a suitable injection cylinder for cooperating with the mold of the clamping unit. This injection cylinder is accessible from the outside of the block 16 through openings 44 therein.

A plurality of cylinders 37 is formed in the cylinder block 16, which may have a rectangular configuration. Although only two cylinders 37 are shown in the figure, block 16 preferably defines four cylinders 37. The other two cylinders 37 would, of course, be behind the two cylinders 37 shown in the figure. Each of these cylinders 37 is divided into two chambers, 36 and 65, by a piston 26. Ports 78 permit the fluid medium from a known source to be fed into and out of the cylinder 37. The fluid is preferably a hydraulic fluid. A piston rod 29 which has an extended portion 29' is attached to each piston 26. The extended portion 29' of each piston rod 29 is brought through a bore 22' provided in a rear cylinder cover 22, and is covered by a respective protective sheath 70. Sheath 70 is fastened to the rear cylinder cover 22 in any well known manner, such as by screw threads. The side of piston 26 facing the rear cylinder cover 22 defines a plurality of flow-through channels 66. These channels 66 are openable and closable by means of valve portion 39 defined by piston rod 29.

Cylinder block 16 has extensions 16' which protrude from the rear end of each cylinder 37 to form a free end thereof. This construction results in a substantial saving in material as well as a reduction in weight.

In order to realize a clamping surface 28 for the front end of cylinder block 16 which is as free and as sturdy as possible, the cylinders 37 are covered on their front side with a cover plate 10 and an additional cover member 18. The cover members 18 are arranged in abutting relationship against angular shoulders 64, and are provided with a seal 14 and a packing 58. Seal 14 and packing 58 may be of any suitable, well known type. Cover member 18 may be fastened in the end of cylinder 37 by any well known, suitable means, such as by screw threads. The cover plate 10 is fastened to the outward face of cover member 18 in a similar manner. Packing 58 is arranged to separate cover plate 10 from cover member 18. Both cover plates 10 and cover members 18 define bores 10′, 18′, respectively, which permit the sliding passage of their respective piston rods 29.

Pistons 29 pass through their respective cover members 18 and cover plates 10 and extend outwardly away from the clamping surface 28 of cylinder block 16. Surface 28, as can be seen from the figure, is defined by the front end surface of block 16 and the cover plates 10. A fixed mold part 60 is attached to clamping surface 16 in a known manner. A movable clamping plate 33 is mounted on the extending ends of the piston rods 29 by reduced diameter portions 74 and nuts 75 on threaded portions 76, and the other mold part 59 is attached to the clamping plate 33 in a known manner. When mold parts 59 and 60 are in their closed position, as shown in the figure, they define a separating groove, or parting plane, 61. In order that the mold parts 59, 60 may be moved relatively rapidly toward and away from each other, at least two additional, preferably hydraulic driving means are provided. These include cylinders 2, pistons 5 and piston rods 9. Cylinder 2 defines fluid ports 79 and is supported at one end by the face 28 of cylinder block 16 and at the other end by piston rod 9 in a bore 42′ through protrusions 42 of clamping plate 33. Nuts 77 retain piston rods 9. These hydraulic driving means have only to exert a relatively small force in order to move the mold parts 59, 60 relative to one another.

Instead of the mold part 60 being attached directly to the clamping surface 28 of cylinder block 16 as shown in the figure, it is also possible to provide a special mold clamping plate (not shown) between the surface 28 and the mold part 60. Such a plate may be seen in FIG. 1 of the U.S. application Ser. No. 792,571 referred to above.

The clamping unit according to the present invention features a protective sleeve 72 which is arranged about the extended, and vulnerable, portion of each piston rod 29. As can be seen in the figure, a recess is provided in each cover plate 10 in which the sleeve 72 fits into and is retained thereby. Preferably, screw threads are formed on plates 10 and sleeve 72 so that they may be threaded together. A sealing lip[1] 73 consisting of synthetic material and supporting the sleeve on the piston rod provided at the other, or free, end of each sleeve 72 to serve as a stripper and wiper for keeping the surface of the piston rods 29 clean. These sealing lips 73 may be constructed of any known, suitable sealing and wiping material.

The sleeves 72 are so dimensioned that when the mold parts 59, 60 are in their closed position, that is when they abut each other, the portion of the piston rod 29 protruding out of the cylinder block 16 are almost completely enclosed. There is preferably, as shown in the figure, a slight gap between the free end of sleeve 72 and the surface 33′ of clamping member 33. The sleeves 72 are also dimensioned so that they enclose the piston rods with a slight play. Advisably, the inner diameter of the sleeve 72 is dimensioned so that the inner surface of the sleeve 72 is at a distance with respect to the outer surface of the respective piston rod 29 which is substantially equal to one millimeter. In addition, the cylinders 37 in the cylinder block 16 should be so dimensioned that for mold parts 59, 60 of the maximum size intended to be used with the clamping unit the distance between the outer surface of each of the sleeves 72 and the adjacent surface of the mold parts 59, 60 is substantially equal to the thickness of the wall of a sleeve 72. That is, there should always be at least this much clearance between the outer surface of sleeve 72 and the mold parts 59, 60.

An exemplary value for the thickness of the walls of the sleeves 72 is three to four millimeters.

The sleeves 72 are preferably drawn from steel tubing, and may be provided with a suitable synthetic coating on their inner surface for increasing the slidability of the inner surface with respect to the piston rods 29. Polytetrafluoroethylene has been found suitable for this purpose.

If the alternative embodiment employing a special clamping plate to clamp mold part 60 to surface 28 of cylinder block 16 is to be employed, it has been found advisable to fasten the sleeves 72 to the special clamping plate instead of to the cover plates 10.

It will be understood that the above description of the present invention is susceptible to various modifications, changes and adaptations, and the same are intended to be comprehended within the meaning and range of equivalents of the appended claims.

What is claimed is:

1. A clamping unit for a mold, having an open and a closed position, of a machine for working synthetic material, said unit comprising, in combination:

(a) fluid drive means for moving the mold between the open and closed position and having at least one cylinder having an end wall, a piston arranged in said cylinder, and a piston rod attached to said piston and having a part extending out of said cylinder through said end wall, that part of said rod which extends outside of said cylinder carrying a first mold part and said end wall of said cylinder carrying, outside of said cylinder, a second part of the mold; and (b) sleeve means mounted on said rod for providing a protective covering for said rod.

2. A clamping unit as defined in claim 1, wherein said fluid drive means is a hydraulic drive means, and wherein there are a plurality of cylinders, each with an opening defining end face, pistons, piston rods and sleeve means.

3. A clamping unit as defined in claim 2, wherein each of said plurality of sleeve means is a sleeve member which is anchored in the end face of a respective one of said cylinders.

4. A clamping unit as defined in claim 3, wherein each of said sleeve members has a wall defining an inner and an outer surface and has threads formed on at least the portion of the outer surface adjacent the end face of its respective cylinders; and further including means common to said plurality of cylinders for mounting said cylinders, and a cylinder cover for each of said cylinders and having inner and outer surfaces with threads formed on them, a cylinder cover being mounted in the opening defined in the end face of a respective one of each of said plurality of cylinders by the threads formed on one of said surfaces, and each one of said sleeve members being anchored to a respective one of said cylinder covers by the threads formed on said one sleeve member engaging in the other surface of said cylinder cover.

5. A clamping unit as defined in claim 4, wherein said sleeve members have a longitudinal dimension parallel to the axis of the respective piston rod, and which is less than the distance between said end faces of said cylinders and said means mounting said second mold part when the mold is in its closed position.

6. A clamping unit as defined in claim 5, wherein said sleeves are dimensioned to fit over said piston rods with a predetermined distance between the inner surface of each one of said sleeve members and the respective piston rods.

7. A clamping unit as defined in claim 6, wherein the distance between the inner surface of each of said sleeve members and the respective piston rods is substantially equal to 1 mm.

8. A clamping unit as defined in claim 7, wherein the inner surface of each of said protective sleeve members is coated with polytetrafluoroethylene.

9. A clamping unit as defined in claim 8, further including additional fluid drive means for moving the mold between the open and closed position mounted parallel to the extent of said piston rod for each of said cylinders for said cylinders to which said sleeve members are at- ---
[1] Annular.

tached, and mounted between the front surface of said cylinder block and said first mold part mounting means.

10. A clamping unit as defined in claim 9, wherein the various elements set out above are dimensioned so that for said first and second mold parts of maximum size the distance between the outer surface of each of said sleeve members and the adjacent surface of said first and second mold parts is substantially equal to the thickness of the wall of each of said sleeve members.

11. A clamping unit as defined in claim 10, further including sealing lips mounted supporting the sleeve on the piston rod on each of said sleeve members at the portion thereof closest to the extended end of the respective piston rods.

References Cited

UNITED STATES PATENTS

| 3,093,863 | 6/1963 | Ehlert | 18—30 LV |
| 3,449,795 | 6/1969 | Fischbach | 18—30 LA |

FOREIGN PATENTS

| 1,235,565 | 5/1960 | France | 18—30 LV |
| 1,529,939 | 5/1969 | Germany | 18—30 LV |
| 1,800,505 | 5/1970 | Germany | 18—30 LA |

J. HOWARD FLINT, Jr., Primary Examiner